Aug. 18, 1931.  S. P. MILLER  1,819,687
PROCESS OF RECOVERING TAR ACIDS
Original Filed Nov. 14, 1924
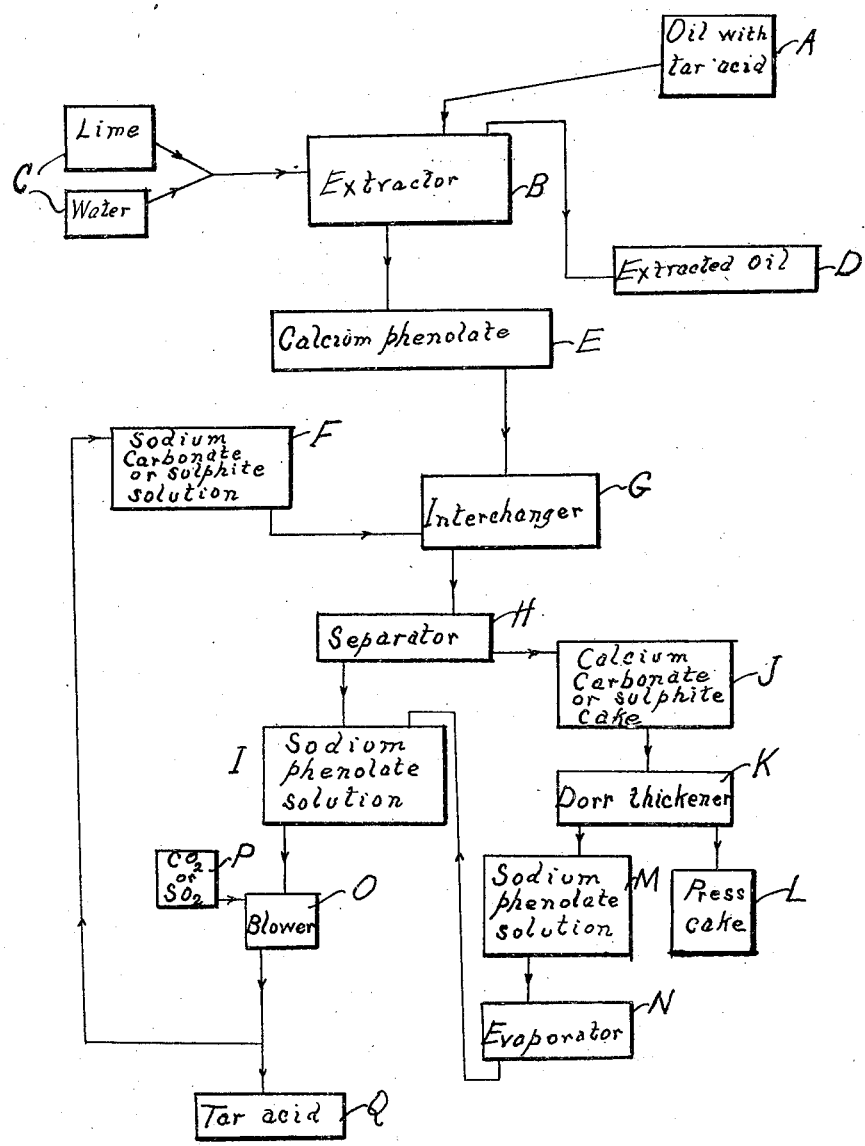
Stuart P. Miller, Inventor
By his Attorney, Chas. W. Mortimer.

Patented Aug. 18, 1931

1,819,687

UNITED STATES PATENT OFFICE

STUART P. MILLER, OF ENGLEWOOD, NEW JERSEY, ASSIGNOR TO THE BARRETT COMPANY, A CORPORATION OF NEW JERSEY

PROCESS OF RECOVERING TAR ACIDS

Application filed November 14, 1924, Serial No. 750,006. Renewed August 22, 1929.

This invention relates to a process for recovering the tar acids from tar oil. Coal tar oils, for example, contain a large percentage, sometimes up to 40% or 50% of acids such as the phenols or carbolic acids which it is often desirable to separate from the other constituents such as the neutral or basic oils.

Heretofore tar acids have been recovered from the oils by treating them with a solution of caustic soda to form solutions of the sodium phenolates or sodium salts of the tar acids, which salt solutions were afterwards separated from the remainder of the oils and treated by blowing carbon dioxide or sulfur dioxide into them to recover the tar acids and form sodium carbonate or sodium sulfite solutions, the acids and salt solutions being easily separated from each other due to their different specific gravities. The phenolate solutions have also been treated with mineral acids for liberation of the tar acids. One of the serious objections to this process is the high cost of the caustic soda that is used for forming the sodium salts of the tar acids.

Another method that has been tried for recovering the tar acids is to treat the oils with lime and blow the calicum salts or phenolates thereby formed with carbon dioxide or sulfur dioxide gas. In this way the phenols or tar acids are set free and calcium carbonate or sulfite is precipitated. The objection to this method is that the solid calcium carbonate or sulfite that is formed carries down such a large amount of the tar acids which cannot be readily recovered as to make the method uneconomical or commercially impractical.

It is possible to treat the calcium phenolate, that results from adding lime to the tar oils, with sulfuric acid to precipitate calcium sulfate or with hydrochloric acid to form calcium chloride. The high cost of these operations, however, make their adoption impractical under ordinary conditions.

By the present process the tar acids can be recovered from the tar oils in a very satisfactory and economical way without encountering great difficulties in the operation.

In carrying out the process in accordance with this invention tar oils containing tar acid are treated with milk of lime to form calcium phenolate. The calcium phenolate solution is then treated with sodium carbonate or sulfite which are alkali salts to precipitate calcium carbonate or calcium sulfite and form sodium phenolate which stays in solution. The calcium carbonate or sulfite precipitate may then be separated by filtration or decantation. The sodium phenolate solution is then blown with $CO_2$ or $SO_2$ gas which are acid anhydrides, in the usual way to form sodium carbonate or sulfite solution and set the tar acids free. The sodium carbonate, or sulfite thereby formed may be used to treat more calcium phenolate.

In case any considerable amount of sodium phenolate remains mixed with the calcium carbonate or sulfite it may be separated by a suitable device for example, by using a Dorr thickener and may then be evaporated to concentrate, if necessary, after which it may also be blown with $CO_2$ or $SO_2$ as above described to form sodium carbonate or sulfite and set the tar acids free. The Dorr thickener is simply a convenient apparatus for continuous washing using the counter-current principle. It has been known and used a long time for continuous washing of precipitates for substantially complete separation from soluble materials.

The press cake in the case of calcium carbonate may be used if desirable as a source of lime with which to treat more tar oils containing tar acids and as a source of $CO_2$ gas for liberation of tar acids from phenolate.

In the accompanying drawing a diagram is shown indicating the different steps in the process.

Tar oil containing tar acids is introduced from a supply A into an extractor B and lime and water from a source C is added. The extracted oil is withdrawn from the top of the extractor B into the vessel D and the calcium phenolate is taken from the bottom of the extractor into the container E. Sodium carbonate or sodium sulfite solution from the container F is introduced with the calcium phenolate into the exchanger G. The sodium phenolate solution and calcium carbonate or calcium sulfite precipitate is then separated in the separator H, the sodium phenolate solution being collected in the container I and the calcium carbonate or sulfite precipitate in the container J. The calcium carbonate or sulfite and whatever sodium phenolate may be mixed therewith is treated in the thickener K from which the solid calcium carbonate or sulfite is taken to the receptacle L and the sodium phenolate solution to the container M and from thence to an evaporator N, if necessary, from where it is introduced into the container I. The sodium phenolate solution is then carried to the vessel O and carbon dioxide or sulfur dioxide gas from the source P is blown into the same so as to set the tar acid free and form sodium carbonate or sulfite. The tar acids are withdrawn to the vessel Q and the sodium carbonate or sulfite solution is returned to the container F.

While the process has been described above with the use of sodium salt or sodium carbonate it will also operate by using the corresponding potassium salt or potassium carbonate or by using the bicarbonate of soda or potash. The term "carbonate" in the claims is intended to include not only the carbonate proper but also the bicarbonate.

The following example is given as a specific illustration of the invention without intending to limit the process to the particular proportions stated or materials mentioned as $SO_2$ can be used instead of $CO_2$ and $K_2CO_3$ can be used instead of $Na_2CO_3$. The bicarbonate or bisulfite of sodium or potassium may likewise be used.

One thousand gallons of oil containing 10% tar acids may be treated with 500 gallons of milk of lime (0.5# of lime per gallon of water). As soon as the reaction is complete, the calcium phenolate solution is separated from the oil. It will be necessary to treat the oil a second time with milk of lime for complete removal of tar acids. The 600 gallons of calcium phenolate is treated with 300 gallons of sodium carbonate solution (15% sodium carbonate). The precipitated calcium carbonate is removed in any convenient way, as for instance, by the use of a Dorr thickener. The sodium phenolate solution is treated with $CO_2$ gas in any convenient apparatus. The resulting sodium carbonate solution and tar acids are separated for recovery of the tar acids. The reaction between the $CO_2$ gas and the sodium phenolate solution goes very quickly and easily, it being necessary merely to pass $CO_2$ gas into the solution.

The process may be used for the recovery of tar acids from oils such as ordinarily called coal tar oils, or from the oils resulting from the low temperature carbonization of coal. It may also be used for the separation of tar acids from petroleum oils, and for the separation of phenolic bodies from wood tars and wood tar distillates. The terms phenols, phenolic bodies and tar acids are used interchangeably throughout this specification.

I claim:

1. In the process of recovering phenols from tar oils containing same, the steps comprising treating the tar oils with lime and water, thereby forming a solution of water soluble calcium phenolates in the presence of tar oil, separating the solution of calcium phenolates from the tar oil, treating the thus separated solution of calcium phenolates with an alkali metal salt capable of precipitating the calcium and forming a solution of a water soluble alkali metal phenolate, and separating the solution of water soluble phenolate from the calcium precipitate.

2. The process of recovering phenols from tar oils containing same comprising treating the tar oils with water and lime, thereby forming a solution of water soluble calcium phenolates in the presence of tar oil, separating the solution of calcium phenolates from the tar oil, treating the thus separated solution of calcium phenolates with sodium carbonate solution, thereby precipitating calcium carbonate and forming a solution of sodium phenolate, separating the sodium phenolate solution from the calcium carbonate precipitate, acidifying the sodium phenolate with carbon dioxide to produce phenols and sodium carbonate solution, separating the phenols and reusing the sodium carbonate solution to make the process cyclic.

3. The process of recovering phenols from tar acids containing the same comprising the steps of treating the tar oils with milk of lime, thereby forming water soluble calcium phenolates, separating the water solution of calcium phenolates thus produced from the tar oils, treating the thus separated water soluble phenolates with sodium carbonate, thereby forming water insoluble calcium carbonate and water soluble sodium phenolates, separating the thus produced insoluble calcium carbonate from the solution of sodium phenolate, acidifying the sodium phenolate to recover phenols, extracting the calcium carbonate to secure phenolates present, recovering the phenols from the said extraction of the calcium carbonate and reusing the calcium carbonate produced to make the process cyclic.

In testimony whereof I affix my signature.

STUART P. MILLER.